US009344805B2

(12) United States Patent
Felberer et al.

(10) Patent No.: US 9,344,805 B2
(45) Date of Patent: May 17, 2016

(54) MICRO-ELECTROMECHANICAL SYSTEM MICROPHONE

(75) Inventors: Franz Felberer, Vienna (AT); Remco Henricus Wilhelmus Pijnenburg, Hoogeloon (NL); Twan van Lippen, Noord-Brabant (NL); Iris Bominaar-Silkens, Valkenswaard (NL)

(73) Assignee: NXP B.V., Eindhoven (NL)

( * ) Notice: Subject to any disclaimer, the term of this patent is extended or adjusted under 35 U.S.C. 154(b) by 679 days.

(21) Appl. No.: 12/625,157

(22) Filed: Nov. 24, 2009

(65) Prior Publication Data

US 2011/0123043 A1 May 26, 2011

(51) Int. Cl.
*H04R 3/06* (2006.01)
*H04B 15/00* (2006.01)
*H04R 19/00* (2006.01)

(52) U.S. Cl.
CPC .......... *H04R 19/005* (2013.01); *H04R 2410/00* (2013.01)

(58) Field of Classification Search
CPC ........................................................ H04R 3/06
USPC .................... 381/174, 369; 324/126; 333/186
See application file for complete search history.

(56) References Cited

U.S. PATENT DOCUMENTS

2001/0033670 A1* 10/2001 Tai et al. ....................... 381/174
2003/0021432 A1* 1/2003 Scheeper et al. .............. 381/174
2003/0026444 A1* 2/2003 de Roo et al. ................. 381/369
2003/0076970 A1 4/2003 Van Halteren
2004/0267134 A1* 12/2004 Hossack et al. ............... 600/459
2005/0185812 A1* 8/2005 Minervini ............. B81B 7/0064 381/355
2006/0067554 A1* 3/2006 Halteren .............. H04R 19/005 381/369
2006/0230835 A1* 10/2006 Wang ..................... H04R 19/00 73/718

(Continued)

FOREIGN PATENT DOCUMENTS

WO 2009/077917 A2 6/2009

OTHER PUBLICATIONS

Rehder, J. et al. "Balanced Membrane Micromachined Loudspeaker for Hearing Instrument Application," J. of Micromechanics and Microengineering, vol. 11, pp. 334-38 (2001).

(Continued)

*Primary Examiner* — Duc Nguyen
*Assistant Examiner* — Phan Le

(57) ABSTRACT

A capacitive micro-electromechanical system (MEMS) microphone includes a semiconductor substrate having an opening that extends through the substrate. The microphone has a membrane that extends across the opening and a back-plate that extends across the opening. The membrane is configured to generate a signal in response to sound. The back-plate is separated from the membrane by an insulator and the back-plate exhibits a spring constant. The microphone further includes a back-chamber that encloses the opening to form a pressure chamber with the membrane, and a tuning structure configured to set a resonance frequency of the back-plate to a value that is substantially the same as a value of a resonance frequency of the membrane.

23 Claims, 4 Drawing Sheets

(56) References Cited

U.S. PATENT DOCUMENTS

| | | | | |
|---|---|---|---|---|
| 2007/0025570 | A1* | 2/2007 | Yonehara et al. | 381/174 |
| 2007/0040547 | A1* | 2/2007 | Berkcan et al. | 324/126 |
| 2007/0201710 | A1* | 8/2007 | Suzuki et al. | 381/174 |
| 2007/0291964 | A1* | 12/2007 | Chien et al. | 381/174 |
| 2008/0219482 | A1* | 9/2008 | Sato | H04R 19/04 381/174 |
| 2008/0279407 | A1* | 11/2008 | Pahl | 381/355 |
| 2009/0016550 | A1* | 1/2009 | Qiao | H04R 19/04 381/175 |
| 2010/0117124 | A1* | 5/2010 | Nakatani | 257/254 |
| 2010/0158280 | A1* | 6/2010 | Coronato et al. | 381/174 |
| 2010/0270631 | A1 | 10/2010 | Renner | |
| 2010/0301967 | A1* | 12/2010 | Schoen et al. | 333/186 |
| 2011/0123052 | A1 | 5/2011 | Bominaar-Silkens et al. | |
| 2012/0033832 | A1 | 2/2012 | van Lippen et al. | |
| 2012/0056282 | A1 | 3/2012 | van Lippen et al. | |
| 2012/0091546 | A1 | 4/2012 | Langereis et al. | |
| 2012/0099753 | A1 | 4/2012 | van der Avoort et al. | |

OTHER PUBLICATIONS

Yazdi, N. et al. "A High-Sensitivity Silicon Accelerometer with a Folded-Electrode Structure," J. of Microelectromechanical Systems, vol. 12, No. 4, pp. 479-86 (Aug. 2003).

Davide Cattin, "Modelling and Control of IRST Capacitive MEMS Microphone", PhD Dissertation International Doctorate School in Information and Communication Technologies, Mar. 1, 2009.

Davide, Cattin; "Modelling and Control of IRST Capacitive MEMS Microphone—Chapter 1-4"; PhD Dissertation International Doctorate School in Information and Communication Technologies; (Mar. 1, 2009).

Davide, Cattin; "Modelling and Control of IRST Capacitive MEMS Microphone—Chapter 6"; PHD Dissertation International Doctorate School in Information and Communication Technologies; (Mar. 1, 2009).

Extended European Search Report for Application No. 10192059.3 (Feb. 17, 2014).

* cited by examiner

MICRO-ELECTROMECHANICAL SYSTEM MICROPHONE

FIELD OF THE INVENTION

The present invention relates generally to a micro-electromechanical system (MEMS) microphone, and more specifically, to controlling the resonance frequency of the backplate of an MEMS microphone.

BACKGROUND

A micro-electromechanical system (MEMS) is a microscopic machine that is fabricated using the same types of steps (e.g., the deposition of layers of material and the selective removal of the layers of material) that are used to fabricate conventional analog and digital CMOS circuits.

One type of MEMS is a microphone. A capacitive MEMS microphone uses a membrane (or diaphragm) that vibrates in response to pressure changes (e.g., sound waves). The membrane is a thin layer of material suspended across an opening in a substrate. The microphone converts the pressure changes into electrical signals by measuring changes in the deformation of the membrane. The deformation of the membrane, in turn, leads to changes in the capacitance of the membrane (as part of a capacitive membrane/counter electrode arrangement). In operation, changes in air pressure (e.g., sound waves) cause the membrane to vibrate which, in turn, causes changes in the capacitance of the membrane that are proportional to the deformation of the membrane, and thus can be used to convert pressure waves into electrical signals.

MEMS microphones are susceptible to the influence of mechanical vibrations (e.g., structure-borne sound), such as may relate to movement of the microphone and/or the device in which the microphone is employed. These vibrations can be undesirably detected as noise, and interfere with the ability of the microphone to accurately detect sound. In addition, many approaches to mitigating noise can affect the ability of the microphone to detect sound, hindering the resolution of the microphone.

The implementation of MEMS microphones continues to be challenging, in view of the above and other issues.

SUMMARY

Consistent with an example embodiment of the present invention, a capacitive micro-electromechanical system (MEMS) microphone includes a semiconductor substrate having an opening that extends through the substrate. The microphone has a membrane that extends across the opening and a back-plate that extends across the opening. The membrane is configured to generate a signal in response to sound. The back-plate is separated from the membrane by an insulator and the back-plate exhibits a spring constant. The microphone further includes a back-chamber that encloses the opening to form a pressure chamber with the membrane, and a tuning structure configured to set a resonance frequency of the back-plate to a value that is substantially the same as a value of a resonance frequency of the membrane (e.g., to match the mechanical acceleration response of the back-plate to the mechanical acceleration response of the membrane).

According to another example embodiment of the present invention, a capacitive MEMS microphone includes a semiconductor substrate having an opening that extends through the substrate. The microphone has a pressure sensitive membrane that extends across the opening and that is configured to generate a signal in response to sound waves. The microphone also has a spring-suspended back-plate that extends across the opening. The spring-suspended back-plate is separated from the pressure sensitive membrane by a first insulator and the back-plate exhibits a spring constant. The microphone further has a tuning back-plate that extends across the opening and that is separated from the spring-suspended back-plate by a second insulator. The microphone further includes a back-chamber that encloses the opening to form a pressure chamber with the membrane, and a bias circuit configured to apply a tuning bias voltage to the tuning back-plate to set a resonance frequency of the spring-suspended back-plate (e.g., a fundamental resonance frequency) to a value that is substantially the same as a value of a resonance frequency of the membrane.

The above summary is not intended to describe each embodiment or every implementation of the present disclosure. The figures and detailed description that follow more particularly exemplify various embodiments.

BRIEF DESCRIPTION OF THE DRAWINGS

The invention may be more completely understood in consideration of the following detailed description of various embodiments of the invention in connection with the accompanying drawings, in which.

Figure 1:
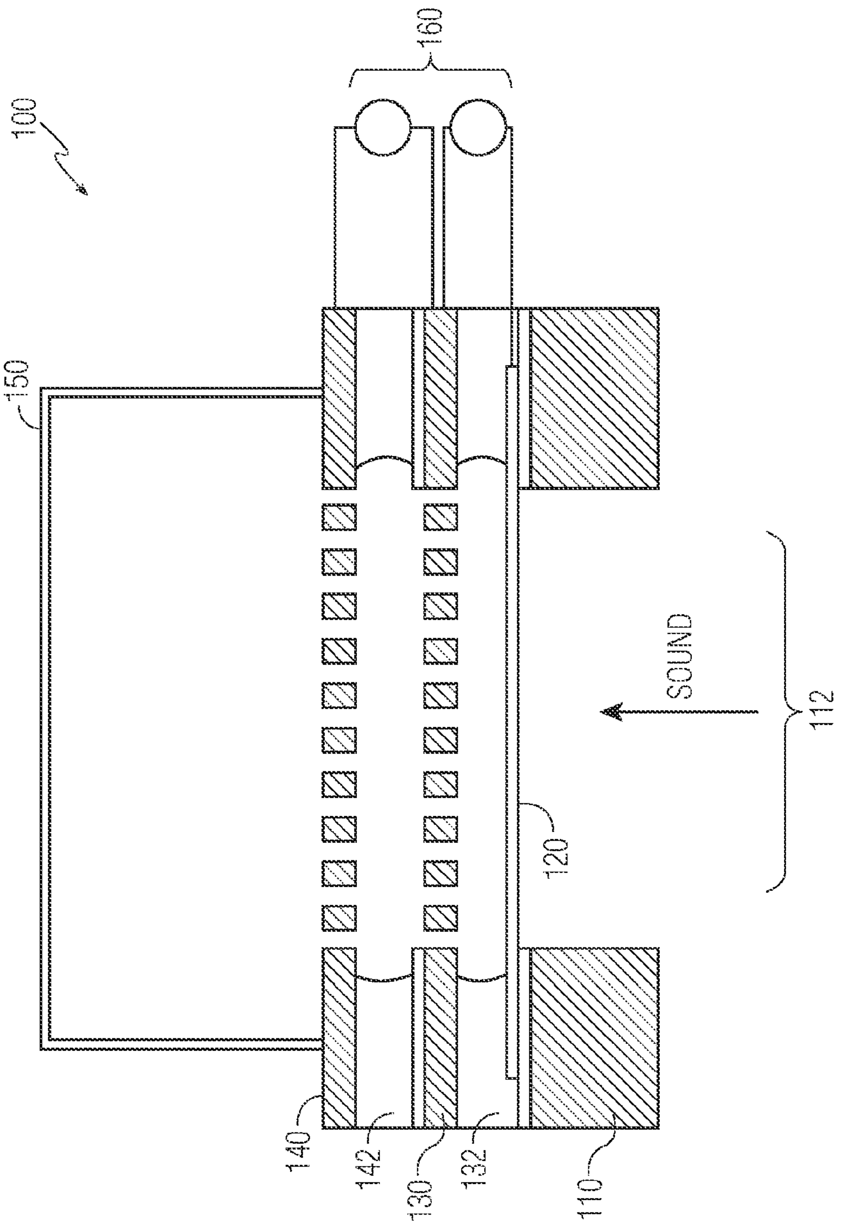
FIG. 1 shows a diagram of a MEMS microphone, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined by the appended claims.

DETAILED DESCRIPTION

The present invention is believed to be applicable to a variety of different types of processes, devices and arrangements for use with MEMS microphones. While the present invention is not necessarily so limited, various aspects of the invention may be appreciated through a discussion of examples using this context.

According to an example embodiment of the present invention, a capacitive MEMS microphone includes a semiconductor substrate having an opening that extends through the substrate. A membrane extends across the opening in the substrate, with the membrane being configured to generate a signal in response to sound. A back-plate also extends across the opening in the substrate and separated from the membrane by an insulator. The back-plate exhibits a spring constant. A back-chamber encloses the opening in the substrate to form a pressure chamber with the membrane. The microphone includes a tuning structure configured to set a resonance frequency of the back-plate to a value that is substantially the same as a value of a resonance frequency of the membrane. Setting the resonance frequency of the back-plate substantially equal to the resonance frequency of the membrane (or, e.g., matching the mechanical acceleration response of the back-plate to the mechanical acceleration response of the membrane) mitigates the susceptibility of the MEMS microphone to mechanical vibrations. In one implementation, the tuning structure includes a tuning back-plate and the resonance frequency of the back-plate is set by applying a bias voltage between the back-plate and the tuning plate.

In the following discussion, various reference is made to matching or otherwise setting a resonance frequency of a back-plate relative to a membrane. In these embodiments, this approach to setting resonance frequency may involve (as an alternative or part of the same approach) setting or controlling the mechanical acceleration response of the back-plate so that it matches the mechanical acceleration response of the membrane. Accordingly, various embodiments involving resonance frequency matching may, instead and/or in addition, match mechanical acceleration responses of the back-plate and membrane.

According to another example embodiment of the present invention, a capacitive MEMS microphone includes a membrane, a flexible back-plate and a second stiffer back-plate on top of the flexible back-plate. The second stiffer back-plate is used to fine-tune the frequency matching between the back-plate and the membrane. A back-plate is always flexible because it is made from a material with a certain Young's modulus/stress and the back-plate has a certain limited thickness. The flexible back-plate is somewhat more flexible than the second stiffer back-plate, which is also somewhat flexible. A first bias voltage is applied between the membrane and the flexible back-plate. The first bias voltage affects the sensitivity of the membrane as well as the resonance frequencies of the membrane and the flexible back-plate. A second bias voltage is applied between the flexible back-plate and the stiff back-plate. The second bias voltage affects the resonance frequency of the flexible back-plate and is used to adjust the resonance frequency of the flexible back-plate without influencing the sensitivity for sound of the membrane. Thus, the second stiffer back-plate and the second bias voltage allow for tuning of the resonance frequency of the flexible back-plate in a manner that is independent of the membrane.

According to a further example embodiment of the present invention, the sensitivity of a capacitive silicon MEMS microphone is set to a desired level by reducing (e.g., minimizing) the influence of mechanical vibrations (e.g., structure-borne sound). In one implementation, such a result is achieved by giving the back-plate the same resonance frequency as the membrane, thereby making the microphone intrinsically insensitive to mechanical noise in the acoustical frequency range. The same resonance frequency refers to the back-plate and membrane having the same excursion for a certain acceleration, because both the resonance frequency and the sensitivity for accelerations of a membrane or a back-plate are given by the k/M ratio (spring constant over mass). In a specific implementation, the resonance frequency of the back-plate is set so that the resonance frequencies of the back-plate and membrane match within 10%.

According to another embodiment of the present invention, electrical tune-able frequency matching of a flexible back-plate (e.g., a spring-suspended back-plate) is performed during operation of the microphone for full body-noise suppression. The resonance frequency of the back-plate is set via electrostatic force between a tuning back-plate and the back-plate resulting from a bias voltage applied to the tuning back-plate. In one implementation, the back-plate is flexible and the tuning back-plate is a stiff back-plate that is less flexible than the back-plate.

According to another embodiment of the present invention, a capacitive MEMS includes a membrane and a back-plate that each have a different sensitivity for acceleration, which leads to a different deflection and therefore to an output signal. This effect, referred to as body noise, is suppressed by matching the resonance frequency of the back-plate to the resonance frequency of the membrane. The membrane excursion Δx relates to acceleration as indicated by equation 1:

$$\left.\begin{array}{l} F = M \cdot a \\ F = k \cdot \Delta x \end{array}\right\} \Delta x = \frac{M}{k} \cdot a \tag{1}$$

The resonance frequency is given by equation 2:

$$f_{res} = \frac{1}{2\pi} \cdot \left(\sqrt{\frac{M}{k}}\right)^{-1} \tag{2}$$

which shows that the ratio M/k determines both the sensitivity and the resonance frequency. Therefore, the resonance frequencies of membrane and the back-plate have the following relationship:

$$f_{res,m} = f_{res,bp} \Rightarrow \Delta x_m = \Delta x_{bp} \Rightarrow \Delta V = 0 \tag{3}$$

In more general terms:

$$\Delta x = \Delta x_m - \Delta x_{bp} = a \cdot \left(\frac{1}{(2\pi f_{res,mem})^2} - \frac{1}{(2\pi f_{res,bp})^2}\right) = a \cdot \left(\frac{(2\pi f_{res,bp})^2 - (2\pi f_{res,mem})^2}{(2\pi f_{res,mem})^2 (2\pi f_{res,bp})^2}\right) \tag{4}$$

$$f_{res,mem} \rightarrow f_{res,bp} \Rightarrow \Delta V \downarrow \tag{5}$$

Thus, matching the resonance frequency of the back-plate to the resonance frequency of the membrane reduces body noise.

FIG. 1 shows a diagram of a capacitive MEMS microphone 100, according to an example embodiment of the present invention. The microphone 100 includes a semiconductor substrate 110 having an opening 112 that extends through the substrate 110. A pressure sensitive membrane 120 extends across the opening 112 in the substrate 110. The membrane 120 is configured to generate a signal in response to sound. A perforated back-plate 130 also extends across the opening 112 in the substrate 110. The back-plate 130 is separated from the membrane 120 by insulating material 132. The microphone 100 further includes a perforated tuning back-plate 140 that extends across the opening 112 in the substrate 110. The tuning back-plate 140 is separated from the back-plate 130 by insulating material 142. A back-chamber 150 encloses the opening 112 to form a pressure chamber with the membrane 120.

A tuning bias voltage is applied between the back-plate 130 and the tuning back-plate 140. For example, the MEMS microphone 100 includes a bias circuit 160 that is configured to apply the tuning bias voltage. The tuning bias voltage is applied to electrically tune the resonance frequency of the back-plate 130 to match the resonance frequency of the membrane 120 and thereby suppress body noise (e.g., in accordance with equations 1-5 above).

In one implementation, electrically tuning the resonance frequency of the back-plate 130 using the tuning bias voltage decouples body nose compensation from microphone sensitivity. For example, the tuning back-plate 140 is used to give the back-plate 130 an extra spring softening without altering the sensitivity of the membrane 120. Application of the tuning bias voltage alters the resonance frequency of the back-plate 130 via electrostatic force between the tuning back-plate 140 and the back-plate 130.

In a further implementation, the bias circuit 160 is configured to apply a bias voltage between the membrane 120 and the back-plate 130 to set the sensitivity of the membrane. The capacitive microphone 100 has a parallel plate set-up consisting of the membrane 120 and the back-plate 130. The membrane 120 can be considered to be in the electrical field of the membrane 130 and therefore encounters an electrical force as shown by equation 6:

$$F_{el} = \frac{q^2}{2\varepsilon_0 A} \tag{6}$$

with q being the charge on the plates, A being the surface of the plates and $\epsilon_0$ being the permittivity of air. The charge q is determined by a bias voltage applied over the parallel plate capacitor, with q being defined by equation 7:

$$q = C \cdot V_{bias} = \frac{\varepsilon_0 A}{d_0} V_{bias}. \tag{7}$$

The combination of equations 6 and 7 results in equation 8:

$$F_{el} = \frac{\varepsilon_0 A}{2d_0(d_0 + \Delta x)} V_{bias}^2 \approx \frac{\varepsilon_0 A}{2d_0^2} V_{bias}^2 - \frac{\varepsilon_0 A}{2d_0^3} V_{bias}^2 \Delta x \tag{8}$$

with $\Delta x$ being the excursion of the membrane 120 and the back-plate 130 with respect to each other. The membrane 120 is suspended by a spring constant $k_{mech}$ and the membrane will have an additional negative spring resulting from the applied bias voltage as defined by equation 9:

$$k_{el} = -(\epsilon_0 A/2d_o^3)V^2_{bias} \tag{9}$$

This effect is referred to as spring softening because the total spring constant k of the membrane is smaller than the mechanical spring constant $k_{mech}$.

In one implementation, the spring softening is used to tune the resonance frequency of the membrane 120. For example, the resonance frequency of the membrane 120 is adjusted by changing the applied bias voltage, which effects spring softening. As shown in equation 10, the (free) resonance frequency is a function of the bias voltage $V_{bias}$:

$$f_0(V_{bias}) = \frac{1}{2\pi}\sqrt{\frac{k_{eff}}{M_{eff}}} = \frac{1}{2\pi}\sqrt{\frac{k_m + k_{el}(V_{bias})}{M_{eff}}} \tag{10}$$

In some implementations, the tuning bias voltage is applied to the tuning back-plate to facilitate the independent adjustment of the sensitivity of the membrane 120 (e.g., via the bias voltage applied thereto), and mitigate a need to adjust the bias voltage applied to the membrane to compensate for body noise. For example, the sensitivity of the membrane 120 is set to the desired level by selecting the bias voltage (thereby also setting the resonance frequency of the membrane), and then the tuning bias voltage applied to the tuning-back-plate 140 is selected responsive to the bias voltage applied to the membrane 130 to set the resonance frequency of the back-plate 130 to be substantially equal to the resonance frequency of the membrane 120.

In another implementation, the tuning back-plate 140 is used to de-stick the membrane 120 from the back-plate 130. During manufacturing of the MEMS microphone 100, the membrane 120 can become stuck to the back-plate 130. The application of the tuning bias voltage between the back-plate 130 and the tuning back-plate 140 electrostatically attracts the back-plate 130 to the tuning back-plate, thereby detaching the back-plate 130 from the membrane 120.

Figure 2:
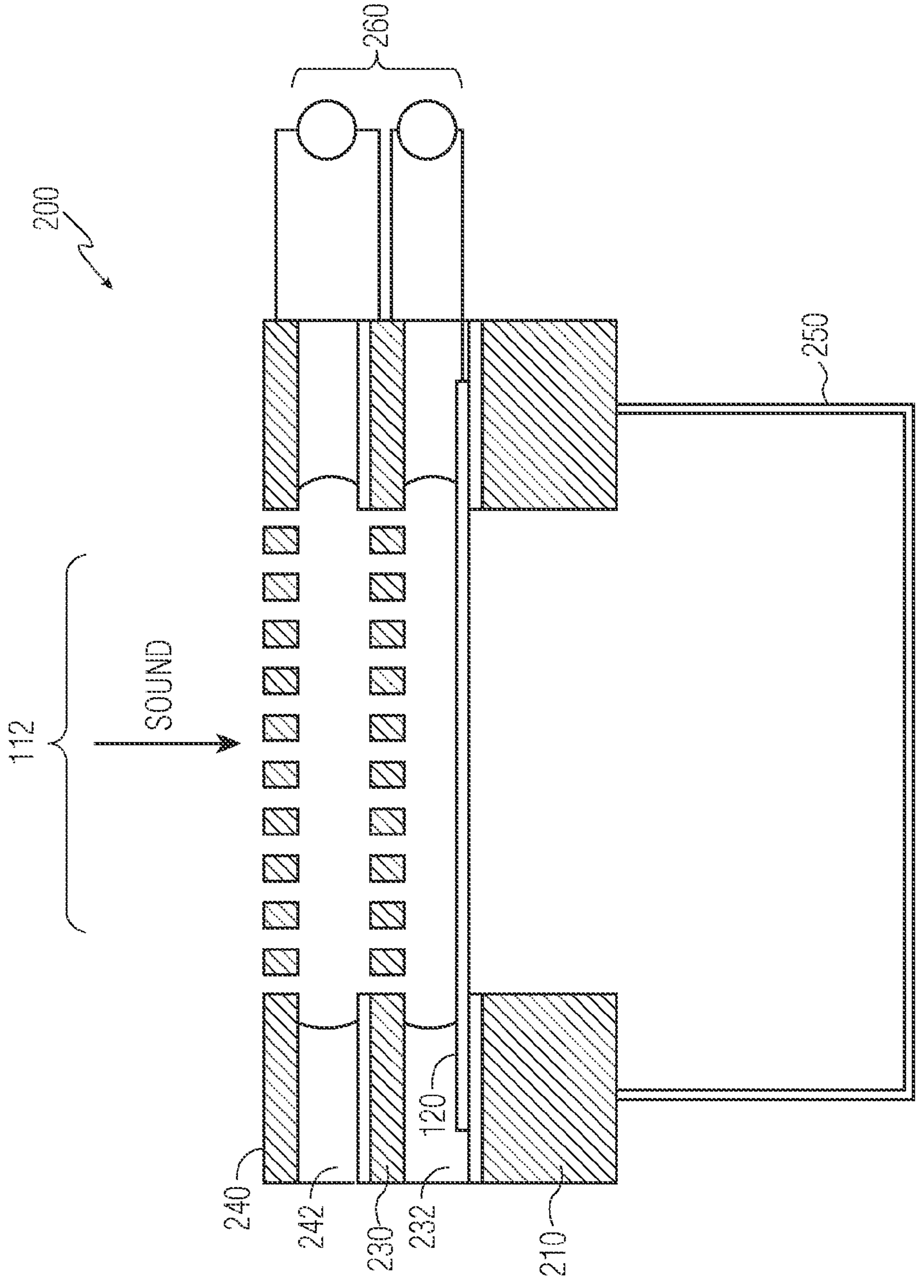
FIG. 2 shows a diagram of a MEMS microphone, according to another example embodiment of the present invention.

FIG. 2 shows a diagram of a capacitive MEMS microphone 200, according to another example embodiment of the present invention. The microphone 200 is similar to the microphone 100 of FIG. 1. The microphone 200 includes a semiconductor substrate 210 having an opening 212 that extends through the substrate 210. A membrane 220 extends across the opening 212 in the substrate 210. A perforated back-plate 230 also extends across the opening 212 in the substrate 210. The back-plate 230 is separated from the membrane 220 by insulating material 232. The microphone 200 further includes a perforated tuning back-plate 240 that extends across the opening 212 in the substrate 210. The tuning back-plate 240 is separated from the back-plate 230 by insulating material 242. A back-chamber 250 encloses the opening 212 to form a pressure chamber with the membrane 220. The back-chamber 250 encloses the opening 212 in the substrate on the opposite side of the substrate 250 from the back-chamber 150 of the microphone 100 in FIG. 1.

A bias circuit 260 is configured to apply a bias voltage between the membrane 220 and the back-plate 230 to set the sensitively of the membrane 220. The bias circuit 260 is also configured to apply a tuning bias voltage between the back-plate 230 and the tuning back-plate 240. The application of the tuning bias voltage electrically tunes the resonance frequency of the back-plate 230 to match the resonance frequency of the membrane 220 and thereby suppress body noise without changing the sensitivity of the membrane 220. In one implementation, application of the tuning bias voltage alters the resonance frequency of the back-plate 230 via electrostatic force between the tuning back-plate 240 and the back-plate 230.

Figure 3:
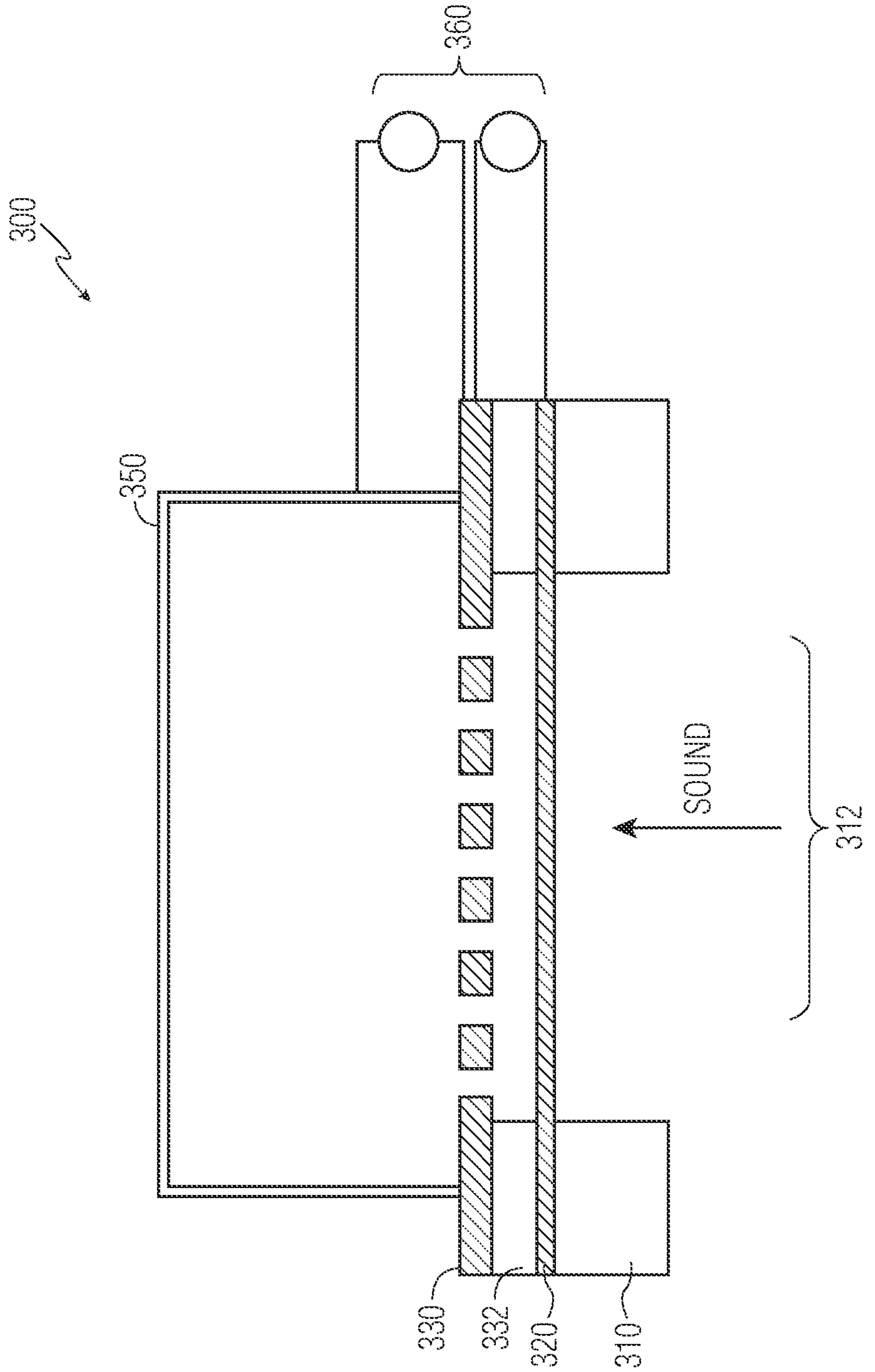
FIG. 3 shows a diagram of a MEMS microphone, consistent with a further embodiment of the present invention.

FIG. 3 shows a diagram of a capacitive MEMS microphone 300, according to a further example embodiment of the present invention. The microphone 300 includes a semiconductor substrate 310 having an opening 312 that extends through the substrate 310. A membrane 320 extends across the opening 312 in the substrate 310. A perforated back-plate 330 also extends across the opening 312 in the substrate 310. The back-plate 330 is separated from the membrane 320 by insulating material 332. The microphone 300 further includes a back-chamber 350 that encloses the opening 312 to form a pressure chamber with the membrane 320.

A bias circuit 360 is configured to apply a bias voltage between the membrane 320 and the back-plate 330 to set the sensitivity of the membrane 320. The bias circuit 360 is also configured to apply a tuning bias voltage between the back-plate 330 and a wall of the back-chamber 350. The application of the tuning bias voltage electrically tunes the resonance frequency of the back-plate 330 to match the resonance frequency of the membrane 320 and thereby suppress body noise without changing the sensitivity of the membrane 320. For example, application of the bias voltage 352 alters the resonance frequency of the back-plate 330 via electrostatic force between the wall of the back-chamber 350 and the back-plate 330.

Figure 4:
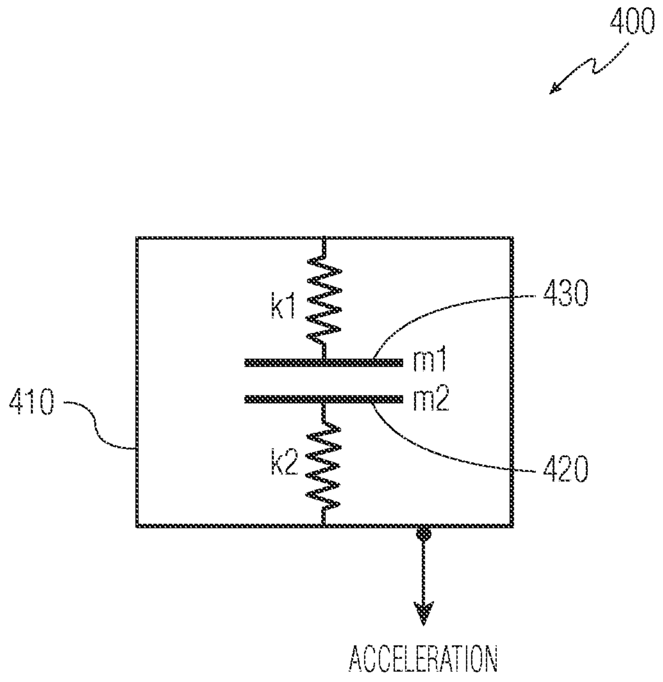
FIG. 4 shows a schematic of an MEMS microphone, according to a further example embodiment of the present invention.

FIG. 4 shows a schematic MEMS microphone 400 having a microphone body 410, and a membrane 420 and a back-plate 430 that each have their own spring constant (k1 and k2) and mass (m1 and m2). The membrane 420 and the back-plate 430 each have a different sensitivity for acceleration (shown by the arrow in FIG. 4). As a result, mechanical vibrations introduce body noise. The body noise resulting from mechanical vibrations is suppressed by matching the resonance frequency of the back-plate 430 to the resonance frequency of the membrane 420. The mass spring-constant ratio M/k (see e.g., equation 3) determines the sensitivity and the resonance frequency of the membrane 420, as well as the resonance frequency of the back-plate 430. The application of the bias voltage between the membrane 420 and the back-plate 430 affects the spring constant k2 of the membrane 420 and thereby adjusts the sensitivity and the resonance frequency of the membrane 420. Thus, the bias voltage is used to set the sensitivity and the resonance frequency of the membrane 420. A tuning bias voltage is applied between the back-plate 430 and a tuning back-plate (not shown in FIG. 4). The tuning bias voltage affects the spring constant k1 of the back-plate 430, and thereby electrically tunes the resonance frequency of the back-plate 430. Thus, the tuning bias voltage is used to set the resonance frequency of the back-plate 430 substantially equal to the resonance frequency of the membrane 420, and thereby suppress body noise.

Accordingly, while the present invention has been described above and in the claims that follow, those skilled in the art will recognize that many changes may be made thereto without departing from the spirit and scope of the present invention.

What is claimed is:

1. A capacitive micro-electromechanical system (MEMS) microphone comprising:

a semiconductor substrate having an opening that extends through the substrate;

a membrane extending across the opening and configured to generate a signal in response to sound;

a back-plate extending across the opening, the back-plate separated from the membrane by an insulator and exhibiting a spring constant;

a back-chamber that encloses the opening to form a sealed pressure chamber with the membrane; and an electrical tuning structure including a tuning back-plate configured to set a resonance frequency of the back-plate in response to a first bias voltage applied to the tuning back-plate, wherein the electrical tuning structure is configured to apply the first bias voltage between the back-plate and the membrane to adjust a sensitivity of the membrane for responding to sound, and apply a second bias voltage between the tuning back-plate and the back-plate to control the tuning back-plate to set the resonance frequency of the back-plate independent of the sensitivity of the membrane, wherein the resonance frequency of the back-plate is set to a value that is substantially the same as a value of a resonance frequency of the membrane.

2. The MEMS microphone of claim 1, wherein the MEMS microphone is subject to body noise, due to a difference between the resonance frequency of the membrane and the resonance frequency of the back-plate; and the tuning structure includes the second bias voltage is sufficient to change the resonance frequency of the back-plate to be substantially equal to the resonance frequency of the membrane, thereby mitigating the body noise.

3. The MEMS microphone of claim 2, wherein: the membrane is subject to sticking to the back-plate; and the electrical tuning structure is configured to unstick the membrane from the back-plate by applying a bias voltage to the tuning back-plate, thereby detaching the back-plate from the membrane.

4. The MEMS microphone of claim 1, wherein the tuning back-plate is arranged substantially parallel to the membrane and the back-plate and the back-plate is located between the membrane and the tuning back-plate.

5. The MEMS microphone of claim 4, wherein the back-plate is perforated and spring suspended; and the second bias voltage applied between the tuning back-plate and the back-plate is based on the first bias voltage applied between the back-plate and the membrane.

6. The MEMS microphone of claim 1, wherein the tuning structure includes the back-chamber, and the back-chamber is configured to adjust the resonance frequency of the back-plate responsive to a bias voltage applied between a wall of the back-chamber and the back-plate.

7. The MEMS microphone of claim 1, wherein the tuning structure includes a tuning back-plate that is separated from the back-plate by another insulator and that exhibits a spring constant.

8. The MEMS microphone of claim 7, wherein the tuning structure further includes a bias circuit configured to apply the second bias voltage to between the back-plate and the tuning back-plate.

9. The MEMS microphone of claim 7, wherein the tuning back-plate is located a distance from the back-plate, the distance being such that electrostatic force resulting from application of the second bias voltage controls the resonance frequency of the back-plate.

10. The MEMS microphone of claim 1, wherein the back-chamber is located on a surface of the substrate and the membrane is located between the back-plate and the back-chamber.

11. MEMS microphone of claim 1, wherein the tuning structure is configured to match a mechanical acceleration response of the back-plate to a mechanical acceleration response of the membrane.

12. A capacitive micro-electromechanical system (MEMS) microphone comprising:

a semiconductor substrate having an opening that extends through the substrate;

a pressure sensitive membrane extending across the opening and configured to generate a signal in response to sound waves;

a spring-suspended back-plate extending across the opening, the spring-suspended back-plate separated from the pressure sensitive membrane by a first insulator and exhibiting a spring constant;

a tuning back-plate, the tuning back-plate extending across the opening and separated from the spring-suspended back-plate by a second insulator;

a back-chamber that encloses the opening to form a sealed pressure chamber with the membrane; and a bias circuit configured to apply at least one bias voltage to the tuning back plate to set a resonance frequency of the spring-suspended back-plate, and wherein another bias voltage between the membrane and the spring-suspended back-plate causes the resonance frequency of the spring-suspended back-plate and the resonance frequency of the membrane to correspond to one another.

13. The MEMS microphone of claim 12, wherein the bias circuit is further configured to set the frequency response of the membrane for responding to sound, and wherein the tuning bias voltage is based on the bias voltage applied between the spring-suspended back-plate and the membrane.

14. The MEMS microphone of claim 12, wherein the tuning back-plate is configured to set the resonance frequency of the spring-suspended back-plate responsive to the other bias voltage by exhibiting an electrical force to influence the spring constant of the spring-suspended back-plate to set the resonance frequency of the spring-suspended back-plate and suppress introduction of body noise via the spring-suspended back-plate.

15. The MEMS microphone of claim 12, wherein the tuning back-plate is stiffer than the spring-suspended back-plate.

16. The MEMS microphone of claim 12, wherein the bias circuit configured to apply the other tuning bias voltage to the tuning back-plate to set an effective spring constant of the spring-suspended back-plate and thereby match a mechanical acceleration response of the back-plate to a mechanical acceleration response of the membrane.

17. method for suppressing introduction of body noise in a capacitive micro-electromechanical system (MEMS) microphone, the microphone including a semiconductor substrate having an opening that extends through the substrate, a membrane extending across the opening and configured to generate a signal in response to sound waves, a back-plate extending across the opening and separated from the membrane by a first insulator, a tuning back-plate extending across the opening and separated from the back-plate by a second insulator, and a back-chamber that encloses the opening to form a sealed pressure chamber with the membrane, the method comprising:

selecting a bias voltage to be applied between the membrane and the back-plate;

applying the bias voltage between the membrane and the back-plate to set a sensitivity of the membrane;

selecting a tuning bias voltage to be applied between the back-plate and the tuning back-plate; and applying the tuning bias voltage between the back-plate and the tuning back-plate to set a resonance frequency of the back-plate and to suppress the introduction of body noise in the MEMS microphone.

18. The method of claim 17, wherein applying the tuning bias voltage includes applying the bias to match a mechanical acceleration response of the back-plate to a mechanical acceleration response of the membrane.

19. The method of claim 18, wherein the tuning bias voltage is selected responsive to the bias voltage applied between the membrane and the back-plate, and wherein applying the tuning bias voltage between the back-plate and the tuning back-plate sets the resonance frequency of the back-plate substantially equal to the resonance frequency of the membrane.

20. The method of claim 17, wherein applying the tuning bias voltage between the back-plate and the tuning back-plate de-sticks the back-plate from the membrane.

21. The MEMS microphone of claim 1, wherein the back-plate is located between the membrane and the back-chamber.

22. The MEMS microphone of claim 2, wherein:

the back-plate is located between the membrane and the back-chamber; and the tuning back-plate is located between the back-plate and the back-chamber.

23. The MEMS microphone of claim 2, wherein:

the back-chamber is located on a surface of the substrate and the membrane is located between the back-plate and the back-chamber; and the back-plate is located between the tuning back-plate and the membrane.

* * * * *